Feb. 3, 1970 K. SCHLÜTER 3,493,963

ANALOG-DIGITAL CONVERTER FOR DIRECT VOLTAGES OR DIRECT CURRENTS WITH LOGARITHMIC VALUATION OF THE INPUT MAGNITUDE

Filed Oct. 22, 1965

INVENTOR
KLAUS SCHLÜTER
BY [signature] ATTORNEYS

United States Patent Office 3,493,963
Patented Feb. 3, 1970

3,493,963
ANALOG-DIGITAL CONVERTER FOR DIRECT VOLTAGES OR DIRECT CURRENTS WITH LOGARITHMIC VALUATION OF THE INPUT MAGNITUDE

Klaus Schlüter, Munich, Germany, assignor to Siemens Aktiengesellschaft, Munich, Germany, a corporation of Germany Filed Oct. 22, 1965, Ser. No. 505,137
Claims priority, application Germany, Dec. 18, 1964, S 94,700
Int. Cl. H03k 13/20
U.S. Cl. 340—347 1 Claim

ABSTRACT OF THE DISCLOSURE

An analog-digital converter for the digital logarithmic valuation of a direct voltage, having a comparator in which such voltage is compared with a direct reference voltage having an exponential time function, a pulse generator being provided which is connected to a pulse counter over a gate circuit which is closed upon establishment of a given amplitude comparison ratio at said comparator, to thereby limit the counting operation, the initial direct voltage being selectively conductable over a calibrating line to the comparator in place of the direct voltage to be measured, and a digital-analog converter operative in response to the output of said pulse counter for providing a control voltage by means of which corrective adjustment of said pulse generator may be effected.

The invention has as its basic problem that of a digital valuation of the level of direct voltages or direct currents. This problem can, for example, be solved with use of an analog operating level meter, on the output side of which there is connected an analog-digital converter of usual type. The analog level measurement value is there transformed into a digital level measurement value, for example according to the principle of stage coding, time coding or other types of coding, in themselves known. However, the fact that the attainable accuracy of measurement is dependent upon the analog level measurement itself, which in the conventional level meters lies, for example, in a percentage range usually greater than one percent, presents a disadvantage.

A further possibility for the solution of this problem is the utilization of a digital voltage or current meter, known per se, without logarithmic valuation (level valuation) of the input magnitude and the connection on the output side thereof, of a data processing stage which automatically carries out a logarithmic valuation of the digitally measured input magnitude. The circuit expenditure necessary for this, however, would be considerably greater than in the measuring method initially mentioned and would considerably increase with requirements for greater accuracy.

The present invention relates to an analog-digital converter for direct voltages or direct currents with logarithmic valuation of the input magnitude, in which great precision of measurement is achievable with avoidance of disadvantages, in particular with respect to the reduction in circuit expenditure as compared to the solutions above referred to. The invention is characterized by the feature that the input magnitude, in a manner known per se, is subjected in a comparator to an amplitude comparison with a corresponding electrical reference magnitude of defined time dependence, in which process a comparator output pulse, formed on reaching a predetermined amplitude ratio, represents one limit of a time interval whose length is digitally evaluable (time coding), with the electrical reference magnitude satisfying an exponential time function with defined time constant, which is formed by currents or voltages arising in the buildup or collapse of an electric or magnetic field.

The logarithmic valuation of the input value takes place with use of an analog operating level meter, corresponding to the first solution initially mentioned, and a valuation stage with logarithmic characteristic curve which can be realized only approximately for example, making use of a series of biased diodes in the form of a polygonal curve. If the logarithmic valuation in the case of the second initially indicated solution is carried out by a data processing stage, while the measurement accuracy can be increased, in the process the circuit expenditure is correspondingly increased. Even in this latter case, however, there is a residual measurement inaccuracy which is due to the fact that the initially connected digital voltage or current meter contains a linearly evaluating coder which is subject to certain tolerances. If a time coder is involved, there then result, for example, tolerances with respect to the linearity of the sawtooth component used as reference magnitude. The analog-digital converter according to the invention, in comparison to this, enables an increase of the measurement accuracy up into the per thousandth range, which is simultaneously associated with a lowering of the circuit expenditure.

Further features and advantages of an analog-digital converter according to the invention are explained in detail in the following with the aid of a preferred example of construction represented in the drawing, in which.

Figure 1:
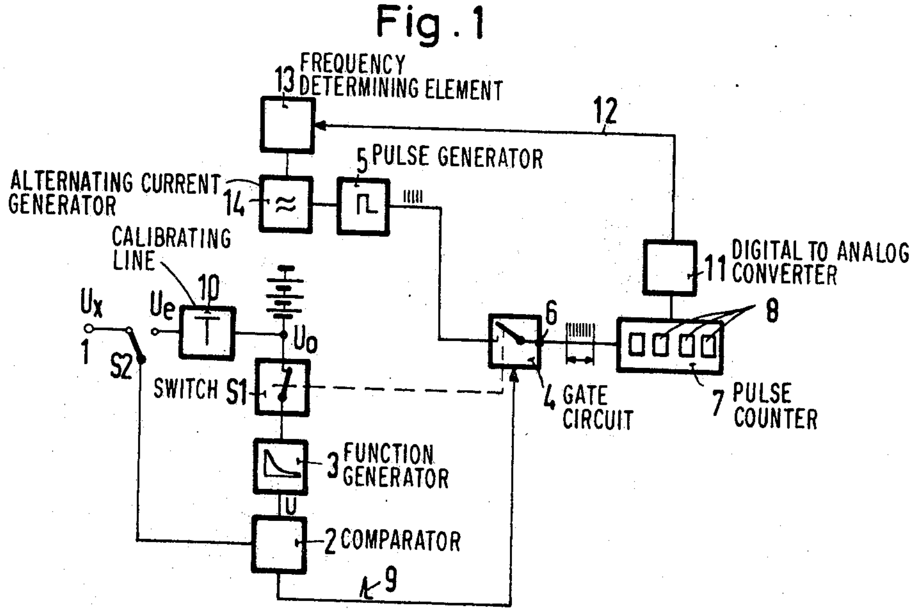
FIG. 1 is a schematic diagram illustrating an analog-digital converter according to the invention which permits a digital evaluation of a negative relative level of the input voltage $U_x$.

Referring to FIG. 1, a direct voltage $U_x$ applied at 1, whose level is to be digitally evaluated, is fed over an electronic switch S2 to the first input of a comparator 2, the second comparator input of which is connected with the output of a function generator 3, which generates a reference voltage $u$ with exponential time dependence. The output of the comparator 2 is connected with the first input of a gate circuit 4, whose second input is connected to the output of a pulse generator 5. The output 6 of the gate circuit is connected with the input of a pulse counter 7 which has individual digit fields 8, in which the counting result is digitally indicated. The function generator 3 is placed, over a switch S1, preferably electronic, on a reference voltage $U_0$, which simultaneously defines the initial value of the reference voltage with exponential time dependence generated by the function generator 3.

The manner of operation of the circuit portions of FIG. 1 thus far described can be explained in detail as follows: Before the start of the measuring process the switch S1 is closed, in which arrangement there is fed to the function generator 3 the reference direct voltage $U_0$. If S1 is again opened, the generator 3 then generates the reference voltage $u$ with exponential time dependence, which is compared with the input voltage $U_x$ in the comparator 2. On reaching amplitude equality or a predetermined amplitude ratio between $u$ and $U_x$ a comparator output pulse 9 is formed, which is fed to the first input of the gate circuit 4.

Figure 2:
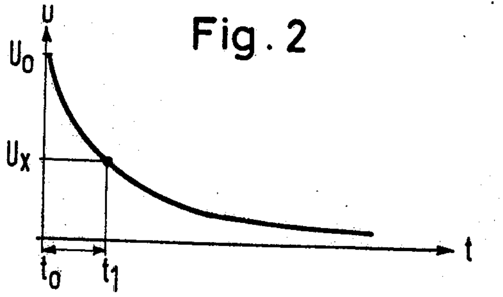
FIG. 2 represents a time diagram of the measuring process.

With the aid of the time diagram according to FIG. 2, in which the time dependent of voltage $u$ is represented, the time measuring course is made clear. Here, the initial value of the reference voltage $u$ corresponds to the value of the reference direct votlage $U_0$, while the voltage $U_x$ lying on input side is plotted on the ordinate. The intersection point of $U_x$ and $u$ is designated by $t_1$, while the commencement of the measuring process, represented by the opening of the switch S1, is displaced with respect thereto at the time point $t_0$. Since the voltage $u$ has a strictly exponential time dependence, the time interval $t_0$, $t_1$ is proportional to the logarithm of the voltage ratio $U_0/U_x$ and thereby strictly proportional to the voltage level referred to $U_0$.

According to FIG. 1 the digital evaluation of the time interval $t_0$, $t_1$ to be interpreted as coding result, takes place in a manner known per se by means of the gate circuit 4, the pulse generator 5 and the pulse counter 7. For this purpose the gate circuit 4 is opened simultaneously with the opening of switch S1. The command pulse necessary for the opening of the gate circuit may be derived, for example, from a pulse generator (not represented) which also controls the electronic switch S1. The counting pulses pass over the now open gate circuit 4 to the pulse counter 7. Only on occurrence of the comparator output pulse 9 is the gate circuit 4 again closed and the pulse counting interrupted. Thus, the digit fields 8 exclusively indicate the number of counting pulses which fall in the time interval $t_0$, $t_1$. If the period duration of the counting pulses generated by the pulse generator 5 as well as the time constant of the reference magnitude is here known, the indication result at 8 can then be used directly as a measure of the relative voltage level applied at 1. To especial advantage the sequence frequency of the counting pulses can be so selected that the measuring unit used for the level valuation of the input magnitude $U_x$, for example 1 neper or 10 db, corresponds, under consideration of a conversion factor of $10^n$ ($n=1$, 2, 3 . . . ), to a period duration of the counting pulse series. The digital indication of the pulse counter 7 thereby corresponds directly, i.e., without further recalculation, to the level value to be measured in digits. The indicated level value is there referred to a zero level defined by the initial value $U_0$ of the reference voltage.

For the purpose of a calibration of the analog-digital converter, the reference direct voltage $U_0$ is fed over a calibrating line 10, following switching over of switch S2 to the righthand contact, from voltage $U_x$ to the first input of the comparator 2 and is there compared with the reference voltage $u$ in the manner described. If the calibrating line 10 is set on a level measuring unit, for example 10 db or 1 neper, the measurement value digitally indicated at 8 must then correspond to this set-in level measure. If the level indication deviates from this desired value a suitable correction can be made expediently through modification of the sequence frequency $x$ of the counting pulse sequence. In particular, such a correction can take place automatically, for which purpose a digital-analog converter 11 is connected with the pulse counter 7, which, in a manner known per se, generates a direct voltage which corresponds to the difference between the indicated value and the desired indication value. This direct voltage is then fed over a line 12 to a frequency-determining element 13 of an alternating voltage generator 14 synchronizing the pulse generator 5 as frequency readjusting voltage. The frequency-determining element 13 can there be electronically controllable (capacitance diode, reactant tube) or electromechanically (rotary capacitor or inductance tuning unit with motor actuation).

The measuring process can be repeated periodically by control of the switch S1 over a counting chain in which case, expediently, through corresponding control of S2 at predetermined time intervals there takes place in each case a calibrating process.

Figure 3:
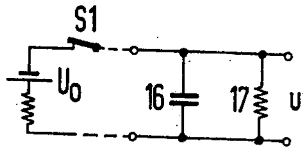
FIGS. 3 and 4 illustrate circuits of a function generator represented schematically in FIG. 1.
Figure 4:
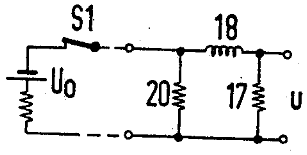

The function generator 3 delivering the reference voltage $u$ consists, in a preferred example of construction according to FIG. 3 of a capacitance 16 which can be connected over the switch S1 to the voltage $U_0$. A discharge circuit is completed over an ohmic resistor 17, in which system the discharge voltage derivable on capacitor 16, following opening of switch S1, representes the output voltage $u$ of the function generator. Instead of the capacitance 16, according to FIG. 4, there can also be used an inductance 18, which upon opening of switch S1, in consequence of the collapsing magnetic field likewise causes to arise an output voltage $u$ with exponential time dependence. The resistor 20 provides a closed circuit with switch S2 open.

In the event a current level $J_x$ is to be evaluated, it is possible in a manner, known per se, to utilize the voltage drop resulting on a resistor of known magnitude for the level measurement.

The comparator 2 may be constructed, for example, as a differential amplifier with Schmitt trigger connected at the output side thereof or as a multiar circuit.

Changes may be made within the scope and spirit of the appended claims which define what is believed to be new and desired to have protected by Letters Patent.

I claim as my invention:

1. An analog-digital converter for the digital logarithmic valuation of a direct voltage, comprising means for producing a direct reference voltage with an exponential time function in the form of a voltage occurring in the build-up or collapse of an electrical or magnetic field, comparator means having respective signal and reference inputs, said direct voltage being connected to said signal input and said direct reference voltage being connected to said reference input, for effecting an amplitude comparison thereof, said comparator means being operative to form a comparator output pulse upon reaching a given amplitude ratio, a gate circuit having a signal input, a signal output and a control input, the comparator output being connected to said control input, a continuously operating pulse generator for producing a periodical counting pulse voltage, the output of said pulse generator being connected to the signal input of said gate circuit, a pulse counter having an input connected to the signal output of said gate circuit, said counting pulse voltage being fed over said gate circuit to said pulse counter with said comparator output pulse closing said gate circuit, thereby limiting the count of said pulse counter, the pulse frequency of said counting pulse voltage being so selected that the measuring unit of said direct voltage (for example 10 db, 1 neper) corresponds under consideration of a conversion factor of $10^n$ ($n=1$, 2, 3, . . .) to a period of the counting pulse voltage, an adjustable calibrating line which is adjustable in measuring units of said direct voltage, the input of said line being connected to said direct reference voltage, switch means for operatively connecting said comparator input with either said direct voltage or the output of said calibrating line for selectively conducting the initial value of said direct reference voltage over said adjustable calibrating line to said comparator means in place of said direct voltage, a digital-analog converter connected to the output of said pulse counter operative to generate a second direct voltage corresponding to the difference between the digital indication value and the measuring unit setting of said calibrating line, and means for feeding said second direct voltage to a frequency-determining element of said pulse generator as a control voltage operative to reduce such difference.

References Cited

UNITED STATES PATENTS

| | | | |
|---|---|---|---|
| 2,897,486 | 7/1959 | Alexander et al. | 340—347 |
| 2,963,697 | 12/1960 | Giel | 340—347 |
| 3,349,390 | 10/1967 | Glassman | 340—347 |
| 3,090,002 | 5/1963 | Allen | 324—5 |
| 3,202,981 | 8/1965 | Bock | 340—347 |
| 3,219,994 | 11/1965 | James | 340—347 |
| 3,258,764 | 6/1966 | Muniz et al. | 340—347 |

OTHER REFERENCES

Barbera W. Stephenson, Analog-Digital Conversion Handbook, Copyright 1964, pp. 62–63.

MAYNARD R. WILBUR, Primary Examiner

C. D. MILLER, Assistant Examiner